United States Patent [19]
Wright et al.

[11] Patent Number: 5,933,087
[45] Date of Patent: *Aug. 3, 1999

[54] SELECTION AND CONTROL

[75] Inventors: Michael M. W. Wright; David James Boshard, both of Kanata; Henry K. Ting, Nepean, all of Canada

[73] Assignee: Mitel Corporation, Ontario, Canada

[21] Appl. No.: 08/957,390

[22] Filed: Oct. 23, 1997

Related U.S. Application Data

[63] Continuation of application No. 08/547,380, Oct. 24, 1995, abandoned, which is a continuation of application No. 08/077,778, Jun. 18, 1993, abandoned.

[30] Foreign Application Priority Data

Jul. 8, 1992 [CA] Canada .................................. 2073495

[51] Int. Cl.$^6$ ..................................................... H04Q 1/00
[52] U.S. Cl. ..................................... 340/825.33; 395/186
[58] Field of Search ......................... 340/825.31, 825.33, 340/825.34, 825.3; 395/180; 380/3, 4, 30

[56] References Cited

U.S. PATENT DOCUMENTS

| | | | |
|---|---|---|---|
| 4,218,582 | 8/1980 | Hellman et al. | 380/30 |
| 4,471,164 | 9/1984 | Henry | 380/30 |
| 4,866,769 | 9/1989 | Karp | 380/4 |
| 5,058,162 | 10/1991 | Santon et al. | 380/4 |
| 5,097,504 | 3/1992 | Camion | 340/825.31 |
| 5,199,066 | 3/1993 | Logan | 340/825.34 |

FOREIGN PATENT DOCUMENTS 2 228 807  9/1990  United Kingdom .

*Primary Examiner*—Brian Zimmerman
*Attorney, Agent, or Firm*—Antonelli, Terry, Stout & Kraus, LLP

[57] ABSTRACT

A method of enabling a functional option in a computer type system is comprised of storing a serial number which is specific to the system, storing different codes each corresponding to a possible functional option which can be enabled in the system, selecting codes corresponding to desired functional options, combining the selected codes and the serial number to obtain a combined option code, receiving a password for enabling functional options corresponding to the selected codes, processing the password through a function apparatus or process to obtain a resultant password, comparing the resultant password with the combined options code, and enabling the desired functional options corresponding to the selected codes in the event the resultant password and the combined options code are the same.

22 Claims, 1 Drawing Sheet

SELECTION AND CONTROL

This is a continuation of application Ser. No. 08/547,380 filed Oct. 24, 1995, now abandoned; which is a continuation of application Ser. No. 08/077,778 filed Jun. 18, 1993, now abandoned.

FIELD OF THE INVENTION

This invention relates to a method of providing functional options to purchasers of computer type systems such as a telephone switching system.

BACKGROUND TO THE INVENTION

A purchaser of a computer type system such as a telephone switching system often purchases the system with certain optional features, but later wishes to add to them. Such features have been provided by selling hardware modules or software upgrades. However such means for adding options is cumbersome, since the supplier must estimate the likely number of upgrades to be purchased within a reasonable future time, and which upgrades are likely to be purchased, and then manufacture and stock hardware option modules or floppy disks carrying software upgrades for those options.

In addition, hardware and software piracy of the modules or software is also a large problem and difficult to detect and to stop.

SUMMARY OF THE PRESENT INVENTION

The present invention is a method of providing options for computer type systems without requiring any stocking of hardware modules or software floppy disks and which virtually eliminates the problem of piracy. The problems of predicting and premanufacturing the quantity and types of options are thus totally eliminated, eliminating the significant cost of producing the option hardware modules or floppy disks, of transport of such items from the supplier, and of the staff required to deal with the manufacture, stocking and transportation of them. Yet any one or plural options can be provided rapidly and securely.

In accordance with the invention, all possible options are provided with the original system, but the options are inhibited from being enabled until options are purchased from the supplier. Once the options have been purchased, the supplier provides a computed code which corresponds to the desired options, the code being referred to herein as a password.

In one embodiment, codes corresponding to the desired options are combined together and combined with the serial number of the system. The combination is processed through a function means, and the result is compared with the password. If the two are identical, the selected options are enabled.

In another embodiment, the password is passed through a function means and the result compared with the combined codes. If the two are identical, the selected options are enabled.

Thus the computer system preferably contains a serial number which is readable by software. Each possible option which is provided with the computer system must contain an unique code. That unique code is either embodied in hardware or firmware readable by software, or is contained in software, depending on how the system operates. Each of the functional options, whether embodied in hardware or software is latent until it is enabled.

The function can be embodied in hardware, firmware or software, and can be any function, but should be a function that is most difficult to figure out. Preferably the knapsack encryption algorithm is used, which has been proven theoretically to be an intractable algorithm. The algorithm utilizes a key which is known only to the vendor of the options, and theoretically cannot be figured out in an amount of time which is described by a polynomial function (which describes an exponential amount of time). It is thus virtually impossible for a pirate to duplicate the enabling passwords, each enabling password for each group of desired functional options for each serial numbered computer type system being different and is virtually impossible to duplicate.

Because the purchaser communicates only information to the supplier and the supplier communicates only information by return, the desired options can be enabled very quickly, and indeed can be effected automatically between computer systems, once there is verification of payment or the acceptance of an order. The supplier need only have a computer system which generates a password which can be entered into the computer type system in which the selected type options are to be enabled.

In accordance with an embodiment of the invention, a method of enabling a functional option in a computer type system is comprised of storing a serial number which is specific to the system, storing different codes each corresponding to a possible functional option which can be enabled in the system, selecting codes corresponding to desired functional options, combining the selected codes and the serial number to obtain a combined option code, receiving a password for enabling functional options corresponding to the selected codes, processing the password through a function apparatus or process to obtain a resultant password, comparing the resultant password with the combined options code, and enabling the desired functional options corresponding to the selected codes in the event the resultant password and the combined options code are the same.

In accordance with another embodiment of the invention, a method of enabling a functional option in a computer type system is comprised of storing a serial number which is specific to the system, storing different codes each corresponding to a possible functional option which can be enabled in the system, selecting codes corresponding to desired functional options, combining the selected codes and the serial number to obtain a combined option code, processing the combined option codes through a function apparatus or process to obtain a resultant options code, receiving a password for enabling functional options corresponding to the selected codes, comparing the resultant options code with the password, and enabling the functional options corresponding to the selected codes in the event the resultant options code and the password are the same.

In accordance with another embodiment of the invention, a method of providing a functional option in a computer type system is comprised of providing a computer type system with a plurality of options already provided, but inhibited from operating, selecting certain desired ones of the options, entering a code into the system, and enabling the selected options upon receipt of the code.

BRIEF INTRODUCTION TO THE DRAWINGS

A better understanding of the invention will be obtained by reference to the detailed description below, in conjunction with the following drawings, in which:

FIG. 1 is a block diagram of a system in which the method can be carried out, and FIG. 2 is a flow chart showing steps in a preferred embodiment of the invention.

DETAILED DESCRIPTION OF THE INVENTION

Figure 1:
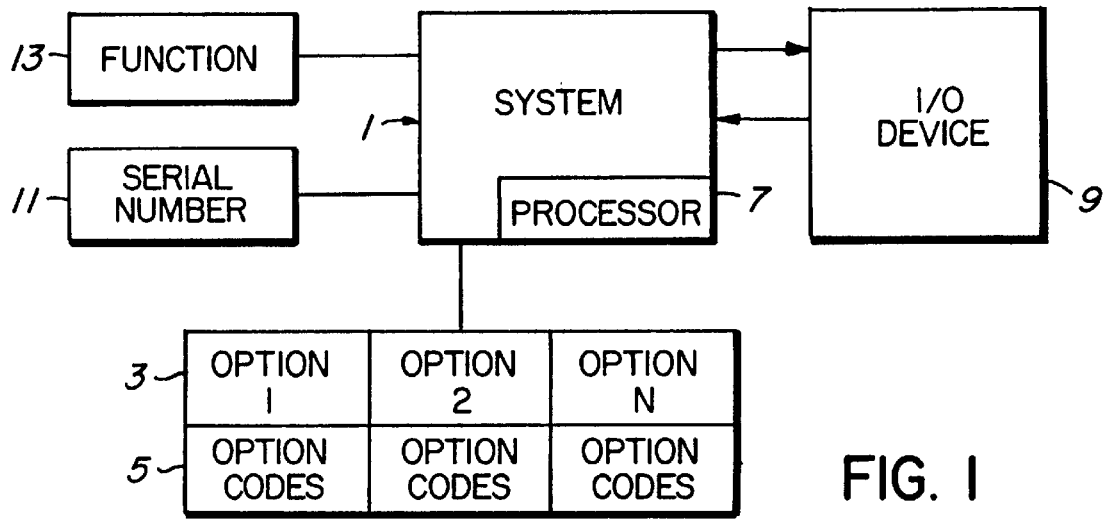

A computer type system 1 is purchased by a buyer from a vendor. The computer type system includes all of the possible functional options 3 that can be implemented on the system, shown as option 1, option 2 . . . option N. These options 3 can be implemented as hardware modules or as software program processes. However it is important that each of the functional options should have its own distinct option code, shown in FIG. 1 as option codes 5.

The option codes can be read by a processor 7 which is part of the system 1, from each functional option, e.g. realized as firmware associated with each hardware module, as some other wired code such as designated by option switches, associated with each hardware module, as a stored number associated with each program implementing a particular functional option, or they may be stored in a table in a memory of system 1.

A table of example internal codes stored in association with each option is shown in Table 1 below.

TABLE 1

| Option | Internal Codes | Selected Codes |
| --- | --- | --- |
| A | 0000000000000001 | |
| B | 0000000000000010 | 0000000000000010 |
| C | 0000000000000100 | 0000000000000100 |
| D | 0000000000001000 | 0000000000001000 |
| E | 0000000000010000 | |
| F | 0000000000100000 | 0000000000100000 |
| G | 0000000001000000 | |
| H | 0000000010000000 | |
| I | 0000000100000000 | |
| J | 0000001000000000 | 0000001000000000 |
| K | 0000010000000000 | |
| L | 0000100000000000 | 0000100000000000 |
| M | 0001000000000000 | |
| N | 0010000000000000 | |
| O | 0100000000000000 | |
| P | 1000000000000000 | |

Let us assume that the system buyer wishes to purchase options B, C, D, F, J and L.

The buyer accesses the table or otherwise designates the particular options by means of an input/output device 9 which can be, for example, a terminal display and keyboard. A dialog box or form is shown on the display with all of the possible options, and if, desired, the associated option codes which the computer system retrieves from the firmware, hardware or functional option programs.

The user then selects the particular options desired. The options can be, e.g. for a telephone system, Advanced Data, DPNSS, visually handicap operator console, etc. On some systems there could be e.g. ninety options available. All options are provided with the original purchase of the system, but are latent and not able to be enabled by the system.

With the selection of particular options, the corresponding internal option codes 5 are distinguished, e.g. as shown in the third column of Table 1, "Selected Codes". It is preferred, although it is not mandatory, that the internal codes should be of binary type.

Figure 2:
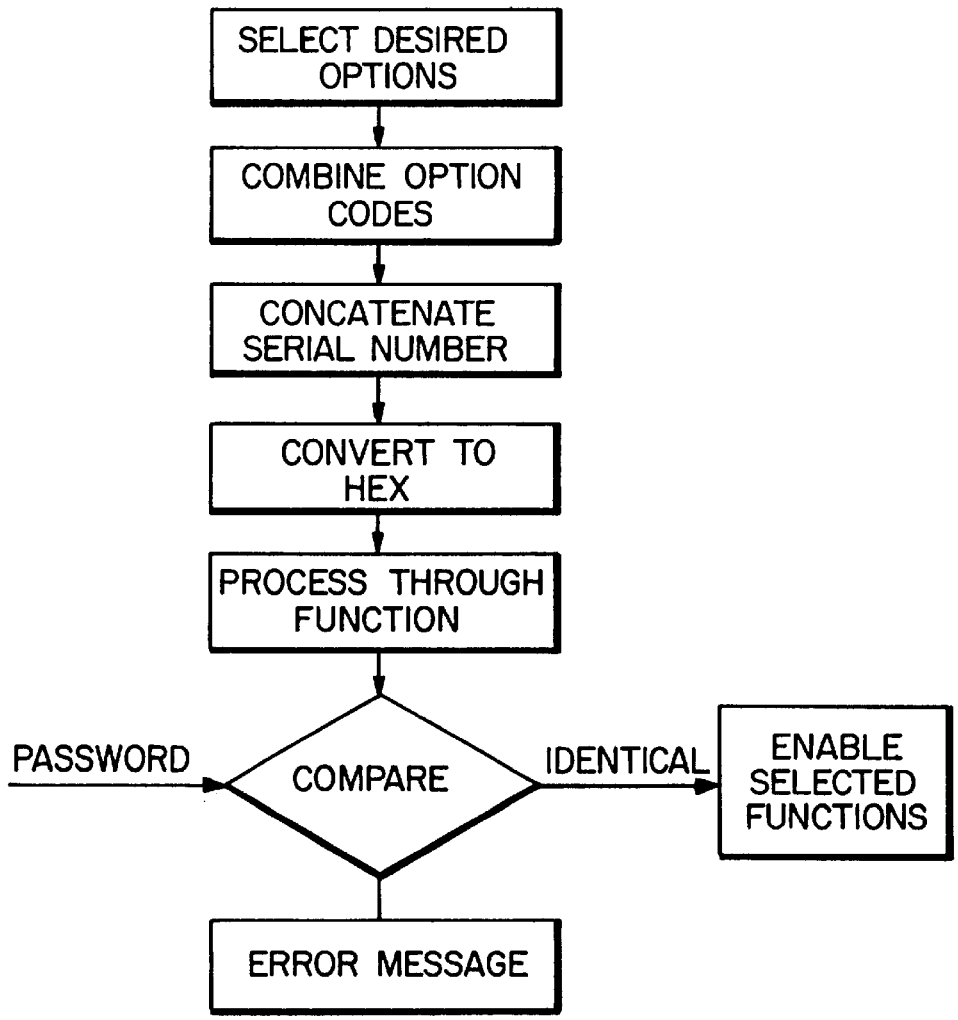

This completes the first step in the process shown in FIG. 2.

The computer system 1 then combines the option codes e.g. by adding. For the selected code shown in Table 1, the following combined option code is produced:

0000101000101110

A software readable serial number 11 (FIG. 1) is associated with computer system 1. This serial number can be in a software readable hardware module, firmware, or can be contained in software. The serial number should be unique to each individual system sold.

The serial number is then combined with the combined option code, preferably by concatenation. For example if the system identifier was 632 or 0000001001111000 in binary:

| | 0000001001111000 | | 0000101000101110 |
| --- | --- | --- | --- |
| yields | 00000010011110000000101000101110111011 | | |

The combined code is converted into HEX, and is 02780A2E.

This combined code in HEX is provided to the options vendor along with payment or arrangements for payment for the options represented by the code.

The vendor provides a password in response. This password is created by the vendor by processing the options code provided to it by the buyer through a function apparatus or process. The apparatus can be a software or a hardware operator. In the present example f(02780A2E)=F5J790, the number F5J790 is the password which the vendor provides to the buyer.

The function f can be any function, but it should be a function which is very difficult to figure out. It is preferred that the function should be based upon the knapsack encryption algorithm, which has been proven in theory to be an intractable algorithm. The algorithm utilizes a key which is only known to the vendor.

A function apparatus or process 13 is also provided in the system, which can operate on a number given to it. The function processed in the function apparatus or process 13 can be identical in all of the systems sold by the vendor, and must process a number in an identical manner to that by the vendor.

The buyer, receiving the password from the vendor enters it via I/O device 9 into the system, which computes a resultant code by operating on the password utilizing the function of function apparatus or process 13. Thus with the entering of the password F5J790, according to one function the result after processing through the function is f(02780A2E), which is the HEX code noted above.

The computer system then causes a comparison of the HEX combined code resulting from the addition and concatenation of the selected codes and serial number, and the code resulting from the processing of the password through the function. The resulting HEX numbers 02780A2E should be the same. If they are the same, the selected options are enabled. If they are not the same, no options are enabled, and an error message can be indicated on the I/O device 9.

Since it is virtually impossible to determine what key has been used by the vendor, it is virtually impossible to pirate the enabling or operation of the options in association with the system.

While it is preferred that the processing should occur in binary and HEX, it will be understood that other number bases can be utilized.

A person understanding the above description, may now conceive of variations or other embodiments. For example, rather than processing the password through a function in the system to obtain a resultant code which is compared with the combined code, the combined code can be processed through the function to obtain a resultant password which is compared with the password received from the vendor.

These and all other embodiments utilizing the principles of this invention are considered to be part of this invention as defined in the claims appended hereto.

We claim:

1. A method of enabling inhibited functional options in a computer type system having a plurality of inhibited functional options comprising:
   (a) storing a serial number which is specific to said system,
   (b) storing different codes each corresponding to an inhibited functional option which can be enabled in said system,
   (c) selecting plural codes each corresponding to a desired functional option,
   (d) combining said selected codes and the serial number to obtain a single combined option code,
   (e) receiving a single password for enabling plural functional options corresponding to said selected codes,
   (f) processing said single password to obtain a single resultant password,
   (g) comparing said single resultant password with said single combined option code,
   (h) enabling the plural desired functional options corresponding to said selected plural codes if the resultant password and the combined option code are the same.

2. A method as defined in claim 1 in which the selected codes are combined by addition.

3. A method defined in claim 2 in which the combined selected codes are combined with the serial number by concatenation.

4. A method as defined in claim 1 in which the password is encrypted, and the step of processing the password through a function is comprised of decrypting the password.

5. A method as defined in claim 4 in which the encryption means or process is an encryption algorithm processed by a processor of the computer type system.

6. A method as defined in claim 5 in which each of the codes is a binary number and in which the serial number is a binary number.

7. A method as defined in claim 6 including converting the combined options code into HEX, and in which the resultant password is in HEX.

8. A method as defined in claim 7 in which the selected codes are combined by addition and the serial number is combined with the added selected codes by concatenation.

9. A method of enabling a functional option in a computer type system having a plurality of inhibited functional options comprising:
   (a) storing a serial number which is specific to said system,
   (b) storing different codes each corresponding to a possible functional option which can be enabled in said system,
   (c) selecting plural codes each corresponding to a desired functional option,
   (d) combining said selected plural codes and the specific serial number to obtain a single combined option code,
   (e) processing said combined options code through a function means to obtain a single resultant options code,
   (f) receiving a single password for enabling plural functional options corresponding to said selected code,
   (g) comparing said single resultant options code with said received single password, and
   (h) enabling the plural function options corresponding to said selected codes if said single resultant options code and said received single password are the same.

10. A method as defined in claim 1 including the step of providing said combined options code to a vendor, processing said combined options code by said vendor through a vendor function using the same function as the computer type system, and obtaining said password thereby.

11. A method as defined in claim 9 including the step of providing said combined options code to a vendor, processing said combined options code by said vendor through a vendor function using the same function as the computer type system, and obtaining said password thereby.

12. A method as defined in claim 10 wherein the function is comprised of a knapsack encryption algorithm.

13. A method as defined in claim 11 wherein the function is comprised of a knapsack encryption algorithm.

14. A method of providing a functional option in a computer type system comprising:
   (a) providing a computer type system with a plurality of options already provided, but inhibited from operating,
   (b) selecting certain desired plural ones of said options,
   (c) entering a single code into said system, and
   (d) enabling the plural selected options upon receipt of said code in said system.

15. A method as defined in claim 14 in which step (d) includes the step of comparing the code with a computer number and enabling the selected options on determining a match of the code with the computer number.

16. A method as defined in claim 15 in which the computer number is derived from both a number unique to the computer type system and from predetermined numbers corresponding to the selected options.

17. A method as defined in claim 16 in which the computer number is also derived by processing a base number corresponding to the combination of said unique number and said predetermined numbers through a first function.

18. A method as defined in claim 17 in which the function includes encryption of the base number.

19. A method as defined in claim 18 in which the code is a password obtained by receiving a number corresponding to the number unique to the computer type system and from predetermined numbers corresponding to the selected options and processing them through a second function identical to said first function.

20. A method as defined in claim 16 including the step of processing a password through a first function and deriving the code thereby.

21. A method as defined in claim 20 in which the function includes encryption of the base number.

22. A method as defined in claim 21 in which the password is obtained by receiving a number corresponding to the number unique to the computer type system and from predetermined numbers corresponding to the selected options and processing them through a second function identical to said first function.

* * * * *